(12) United States Patent
Kawai et al.

(10) Patent No.: US 6,444,942 B1
(45) Date of Patent: Sep. 3, 2002

(54) WELDING CONTROL SYSTEMS

(75) Inventors: Shingo Kawai, Nagoya (JP); Satoru Kawamatsu, Nagoya (JP)

(73) Assignee: Nadex Co. Ltd, Nagoya (JP)

( * ) Notice: Subject to any disclaimer, the term of this patent is extended or adjusted under 35 U.S.C. 154(b) by 0 days.

(21) Appl. No.: 09/632,377

(22) Filed: Aug. 3, 2000

(30) Foreign Application Priority Data

| Aug. 3, 1999 | (JP) | 11-220402 |
|---|---|---|
| Aug. 18, 1999 | (JP) | 11-231028 |
| Aug. 19, 1999 | (JP) | 11-232187 |

(51) Int. Cl.$^7$ ............................... B23K 11/24
(52) U.S. Cl. ................................ 219/110
(58) Field of Search ................ 219/110; 700/2, 700/3

(56) References Cited

U.S. PATENT DOCUMENTS

| 4,937,419 A | | 6/1990 | Kolodziej et al. | 219/110 |
|---|---|---|---|---|
| 5,166,491 A | * | 11/1992 | Izume et al. | 219/110 |
| 5,276,308 A | | 1/1994 | Hasegawa | 219/110 |
| 5,347,105 A | | 9/1994 | Kawai | 219/110 |
| 5,440,092 A | | 8/1995 | Kawai | 219/110 |
| 5,471,028 A | | 11/1995 | Kawai | 219/110 |
| 5,483,035 A | | 1/1996 | Kawai et al. | 219/110 |
| 5,714,733 A | | 2/1998 | Moro | 219/112.61 |
| 5,808,885 A | * | 9/1998 | Dew et al. | 219/110 |
| 6,004,019 A | * | 12/1999 | Suita et al. | 700/2 |
| 6,130,396 A | | 10/2000 | Hasegawa et al. | 219/110 |

FOREIGN PATENT DOCUMENTS

| JP | 5-285672 | 11/1993 |
|---|---|---|
| JP | 7-108385 | 4/1995 |
| JP | 2514882 | 4/1996 |

OTHER PUBLICATIONS

Protester's arguments in Japanese filed in Japanese Application 11–231028, (no date).

JEM–F 3008—Field Network Standard for Programmable Controllers (Level 1); Japanese Electronic Industry Association; Nov. 14, 1996.

English translation of the pertinent portion of the protester's arguments (concise explanation in English of the cite reference). (no date).

Co–Pending U.S. patent application Ser. No. 09/632,364; filed Aug. 3, 2000; Field Programmable Welding Controller.

* cited by examiner

*Primary Examiner*—Clifford C. Shaw
(74) *Attorney, Agent, or Firm*—Lyon & Lyon LLP

(57) ABSTRACT

A single teaching apparatus may be provided for all welding control apparatus in a welding control apparatus in order to input the welding sequence data. The internal address of a welding control apparatus 22 and the welding sequence data are output to a field bus from an upper control apparatus 2. Programming is accomplished by storing the welding sequence data output from the upper control apparatus 2 in a designated address of memory unit 28. Programming of the welding control apparatus 22 can be accomplished: using the teaching apparatus 4 provided for the upper control apparatus 2.

19 Claims, 10 Drawing Sheets

WELDING CONTROL SYSTEMS

FIELD OF THE INVENTION

The present application relates to welding control systems. More particularly, it relates to welding control systems that can be produced, operated and maintained at a low cost.

BACKGROUND OF THE INVENTION

Welding apparatus are frequently utilized together with robots, workpiece transferring systems, and workpiece positioning jigs to automate the welding process. In such cases, it is necessary to synchronize the operation of, for instance, the robot and the welding apparatus. Normally, when the workpiece has been moved by the workpiece transferring system to a prescribed position and/or the workpiece positioning jig has reached at a prescribed position in which welding can be performed, a signal to start welding is sent to the welding control apparatus. Hereinafter, the apparatus that sends the signal to start welding to the welding apparatus will be called the "upper control apparatus."

The optimum welding conditions, such as the magnitude of the welding current, the time variation of the current magnitude, the duration of the current flow, and the pressure applied to the workpiece by the pair of welding guns and other welding parameters, will vary. The welding conditions depend, for example, on the type of material that is being welded, its thickness, surface treatment and welding position. Therefore, a plurality of welding sequence data, which correspond to the various types of welding operations, are stored in the welding apparatus. After accessing the specific welding sequence data that correspond to the type of welding to be performed, the prescribed welding process is initiated.

As shown in FIG. 1, a known welding control system includes upper control apparatus 102, welding control apparatus 122, and a set of cables 100 connecting the two apparatus.

The upper control apparatus 102 controls the robot, workpiece transferring system, positioning jig for the workpiece, and the time to start the welding. Upper control apparatus 102 comprises CPU 106, memory unit 108, and input/output interface (I/O) 110. A teaching apparatus 104 for the upper control apparatus 102 is connected to the upper control apparatus 102. The program and data necessary for the upper control apparatus 102 to control the robot, workpiece transferring system, and workpiece positioning jig are sent to the upper control apparatus 102 from the teaching apparatus 104. Timing data for the welding control apparatus 122 to start the welding, and data instructing the type of welding to be performed at the prescribed time, are also sent to the upper control apparatus 102 from the teaching apparatus 104. These instruction data are stored in the memory unit 108.

The welding control apparatus 122 controls the welding apparatus by controlling the welding transformer 136 and a set of valves 138 that controls the opening and closing of a pair of welding guns (not shown). The welding control apparatus 122 comprises CPU 126, memory unit 128, No. 1 I/O 124, No. 2 I/O 130, and a switching element 132. The switching element 132 is placed between the welding power supply 134 and welding transformer 136 and controls the effective welding current by intermittently turning on and off the connection of the welding power supply 134 and welding transformer 136. The welding transformer supplies current to the pair of welding guns.

A teaching apparatus 105 is provided for the welding control apparatus and is connected to the welding control apparatus 122. The pertinent data necessary for the control of the welding operation is transmitted to the welding control apparatus 122 from the teaching apparatus 105, and stored in memory unit 128. The welding sequence data, which is transmitted from the teaching apparatus 105, is stored in memory unit 128 of the welding control apparatus 122.

In order to achieve satisfactory welding results, various welding conditions, such as the magnitude of the welding current, the time variation of the current magnitude, the duration of the current flow, and the pressure applied to the workpiece by the pair of welding guns and other welding parameters, must be adjusted to optimum values. However, these optimum values differ for different types of welding conditions. For example, a lower welding current is preferred when welding thin iron plates as compared to thick iron plates, because the heat dissipated to the area surrounding the welding point is less. Similarly, a lower welding current is preferred when welding the corner of iron plates as compared to the center of iron plates, because the heat dissipated to the area surrounding the welding point is less. Thus, welding control apparatus 122 must be capable of welding using optimum conditions that are suitable for each different type of welding environment, such as thick iron plates, thin iron plates and welding the corners or the center of the plates. Therefore, teaching apparatus 105 is utilized to instruct the welding control apparatus 122 to use the appropriate set of data corresponding to the type of welding to be performed. The welding sequence data stored in memory unit 128 provides the data necessary to adjust the welding conditions to the optimum values for each type of welding. For example, welding sequence data 1 indicates the optimum welding conditions, such as the magnitude of the welding current, the time variation of the current magnitude, the duration of the current flow, and the pressure applied to the workpiece by the pair of welding guns and other welding parameters, for welding type 1, which may be for instance, corner welding of thin iron plates.

As described above, the upper control apparatus 102 is programmed to control the robots and other apparatus. At the appropriate time for the robot to start welding, upper control apparatus 102 outputs a signal to the welding control apparatus 122 to start the welding. The upper control apparatus 102 not only outputs the signal to start welding, but also outputs a signal to indicate the type of welding. Therefore, appropriate welding conditions for different types of welding can be provided.

At I/O 110 of the upper control apparatus 102, a number of separate output ports are provided to accommodate a corresponding number of welding types. Therefore, the signal indicating the welding type as well as the signal indicating the start of welding can be transmitted from the upper control apparatus 102 to the welding control apparatus 122. Similarly, a corresponding number of input ports are provided at I/O 124 of the welding control apparatus 122. Cable group 100 connects the corresponding ports. For example, when welding type 1 is to begin, the No. 1 port of I/O 110 is set high. This high signal is transmitted to the No. 1 input port of I/O 124 via one of the cables in the cable group 100. Then, instructions to start the welding using welding type 1 conditions are provided to the welding control apparatus 122.

Additionally, an output port is provided at I/O 124 so that a signal indicating the completion of the welding operation can be transmitted from the welding control apparatus 122 to the upper control apparatus 102. Similarly, an input port is provided at I/O port 110. The two ports are connected by cable 110 so that the welding complete signal can be transmitted from the welding control apparatus 122 to the upper control apparatus 102.

In this welding control system, a number of I/O ports corresponding to the number of welding types that can be performed by the welding control apparatus is required for each I/O port 110 and 124 of the upper control apparatus 102 and welding control apparatus 122. In addition, a number of cables corresponding to at least the number of welding types accommodated are required between the upper control apparatus 102 and the welding control apparatus 122. Furthermore, it is necessary to transmit a welding completion signal from the welding control apparatus 122 to the upper control apparatus 102. Consequently, the required number of ports and cables increases further.

There have been greater demands, in recent years, for production lines capable of producing many different types of products. Consequently, the number of different types of welding conditions has increased, and the number of necessary cables has increased, thereby increasing the labor costs that are necessary to maintain the cables. When two or more welding control apparatus are connected to the upper control apparatus, these issues become more problematic. For example, in an automobile assembly line, many welding apparatus operate simultaneously to assemble an automobile body. Therefore, many welding control apparatus are usually connected to the upper control apparatus.

In the known welding control system shown in FIG. 2, the system comprises s plurality of welding control apparatus (222A, 222B) connected to one upper control apparatus 202 via a set of cables 206. Because many cables are required to form the connections to the upper control apparatus 202, the wiring tasks become complex and the labor required to maintain the cable groups increases.

In order to reduce the number of cables required, a system shown in FIG. 3 has been developed. In the systems shown in FIG. 1 and FIG. 2, the number of cable groups equals the number of types of welding conditions plus one (one additional cable is required to transmit the welding complete signal) for each welding control apparatus. In the system shown in FIG. 3, the welding control apparatus 322A, 322B, 322C, etc. are connected to the upper control apparatus 302 via a field bus 350.

Field bus 350 is a system for connecting the upper control apparatus 302 in series with the welding control apparatus 322A, 322B, and 322C. It does not connect the upper control apparatus 302 and each welding control apparatus 322A, 322B, and 322C in parallel on a one-to-one basis as in FIG. 1 and FIG. 2.

In the system shown in FIG. 3, the welding type signal and the welding start signal are sent to the welding control apparatus 322A, 322B, and 322C via the field bus 350. At this time, in order to determine which welding control apparatus will receive the signal, a unique address is assigned to each welding control apparatus beforehand. Hereinafter, this unique address is called the "apparatus address." When it is time to start the welding operation, the upper control apparatus 302 outputs a particular apparatus address followed by a welding type signal to the field bus 350 in order to instruct the welding control apparatus having the same apparatus address to start welding. The data, which instructs each welding control apparatus to start a particular type of welding operation when the robot has reached a particular phase of its operation, are transmitted to the upper control apparatus 302 from the teaching apparatus 304, ahead of time.

The welding control apparatus receiving the apparatus address output from the field bus 350 inputs the welding type data following the apparatus address, and starts the welding control based on the corresponding welding sequence data.

The welding sequence data corresponding to the welding type are transmitted from the teaching apparatus ahead of time. As shown in FIG. 3, a teaching apparatus 305A supplies a plurality of welding sequences to the welding control apparatus A. Similarly, a teaching apparatus 305B supplies a plurality of welding sequences to the welding control apparatus B, and a teaching apparatus 305C supplies a plurality of welding sequences to the welding control apparatus C.

In the system shown in FIG. 3, the upper control apparatus 302 and the welding control apparatus 322A, 322B, and 322C are connected via field bus 350. I/O ports of the upper control apparatus and the welding control apparatus are not required to be connected in parallel on a one-to-one basis. Consequently, the number of required cables can be reduced significantly.

In addition, because this system utilizes the same teaching system shown in FIG. 1 and FIG. 2, the operators are likely to be familiar with the teaching function of the welding control apparatus.

However, in the system shown in FIG. 3, the welding sequence data is transmitted separately to each welding control apparatus. Consequently, each welding control apparatus requires a teaching apparatus, and instructions must be received from the corresponding teaching apparatus. This arrangement increases the cost of the system and makes the operation of the system cumbersome.

Another known welding control apparatus contains a program that detects and stores data concerning welding work in progress and under its control. For example, the magnitude of the welding current passed through the workpiece is detected and stored for each welding location. In this case, this type of monitoring system enables the analysis of the cause of welding defects discovered afterwards based on the recorded data.

It is desirable to have centralized management of monitored data when many welding control apparatus are used together. Consequently, a system taught by Japanese Patent No. 2514882 is shown in FIG. 4 in which a host computer 804 is connected to each welding control apparatus. The host computer 804 collects and stores the monitored data, and performs centralized monitoring. In this system, an upper control apparatus 800 and the centralized monitoring host computer 804 are connected to analyze the monitored data.

In the known system of FIG. 4, in which the host computer 804 is provided in addition to the upper control apparatus 800, each welding control apparatus A, B, and C is connected to the host computer 804 via a serial communication line 806. The host computer 804 accesses each welding control apparatus A, B, and C via the serial communication line 806 and extracts the monitored data.

SUMMARY OF THE INVENTION

The known system utilizing a field bus shown in FIG. 3 reduces the number of cables required to connect the upper control apparatus and the welding control apparatus over other known systems. However, in order to transmit the welding sequence data to the welding control apparatus, an exclusive teaching apparatus is needed for each welding control apparatus to transmit welding sequence data. This makes the operation of the system cumbersome.

Further, in the known system shown in FIG. 4, each welding control apparatus A, B, C, etc. must be connected to the upper control apparatus 800, and to the host computer 804, which requires extra wiring and increases the wiring costs. Additionally, the labor costs for maintenance and inspection of the wiring is high.

Therefore, it is one object of the present invention to teach welding control systems that overcome such problems in the art.

In one aspect of the present teachings, monitored data may be centrally managed simply by connecting each welding control apparatus A, B, C, etc. with the upper control apparatus 800.

In another aspect of the present teachings, the welding control apparatus may be programmed by the upper control apparatus by outputting the address data of the welding control apparatus, the internal address of the welding control apparatus, and the welding sequence data from the upper control apparatus to the field bus.

In another aspect of the present teachings, a common teaching apparatus may program a plurality of welding control apparatus, thereby minimizing system requirements and simplifying operation.

Other objects, features and advantages of the present invention will be readily understood after reading the following detailed description together with the accompanying drawings and the claims.

The above and other preferred features of the invention, including various novel details of implementation and combination of elements will now be more particularly described with reference to the accompanying drawings and pointed out in the claims. It will be understood that the particular methods and circuits embodying the invention are shown by way of illustration only and not as limitations of the invention. As will be understood by those skilled in the art, the principles and features of this invention may be employed in various and numerous embodiments without departing from the scope of the invention.

BRIEF DESCRIPTION OF THE FIGURES

Reference is made to the accompanying drawings in which are shown illustrative embodiments of aspects of the invention, from which novel features and advantages will be apparent.

DETAILED DESCRIPTION OF THE DRAWINGS

Figure 1:
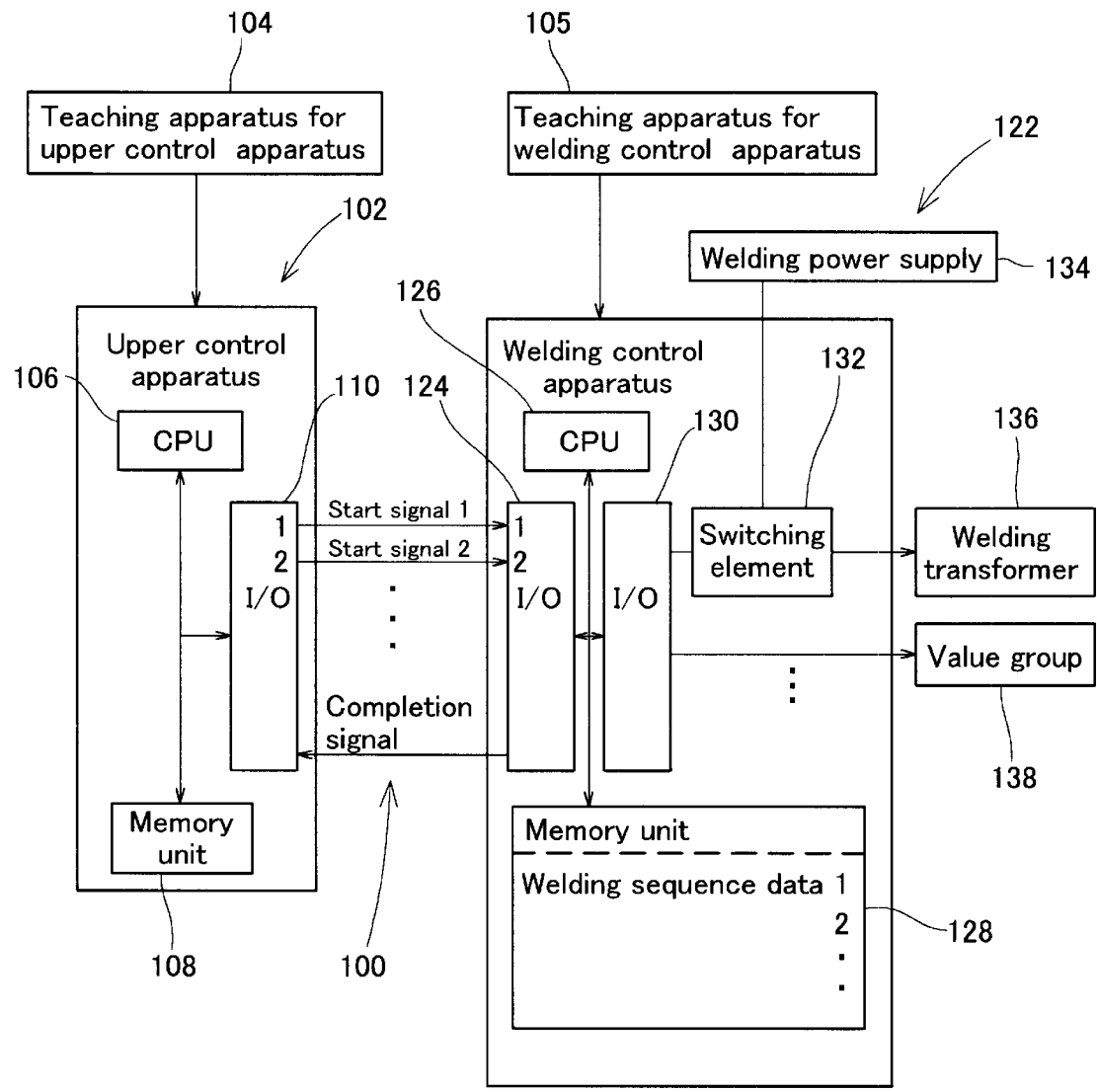
FIG. 1 shows an outline of a known welding control system utilizing exclusive cables.
Figure 2:
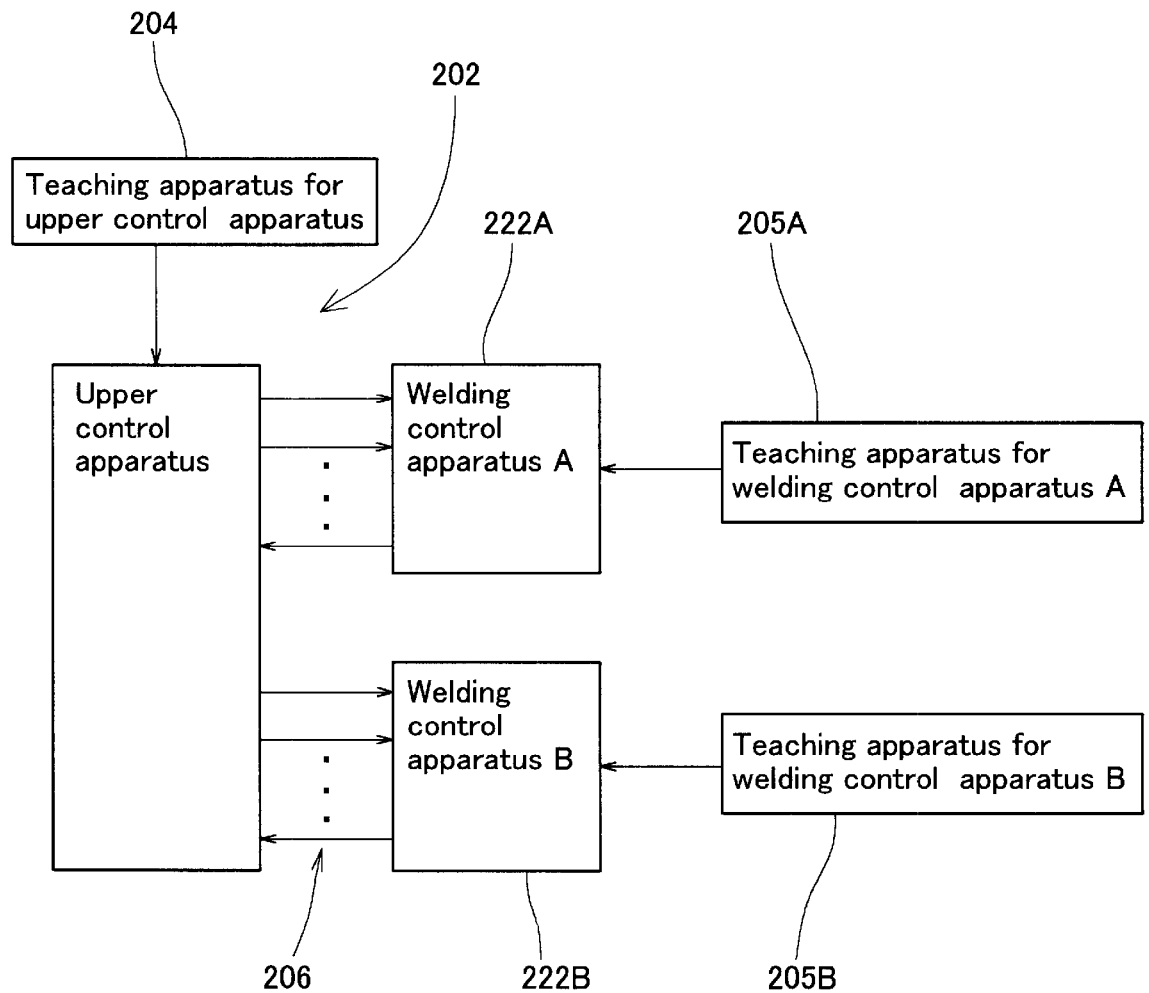
FIG. 2 shows a known welding control system wherein a plurality of welding control apparatus are connected with exclusive cables.
Figure 3:
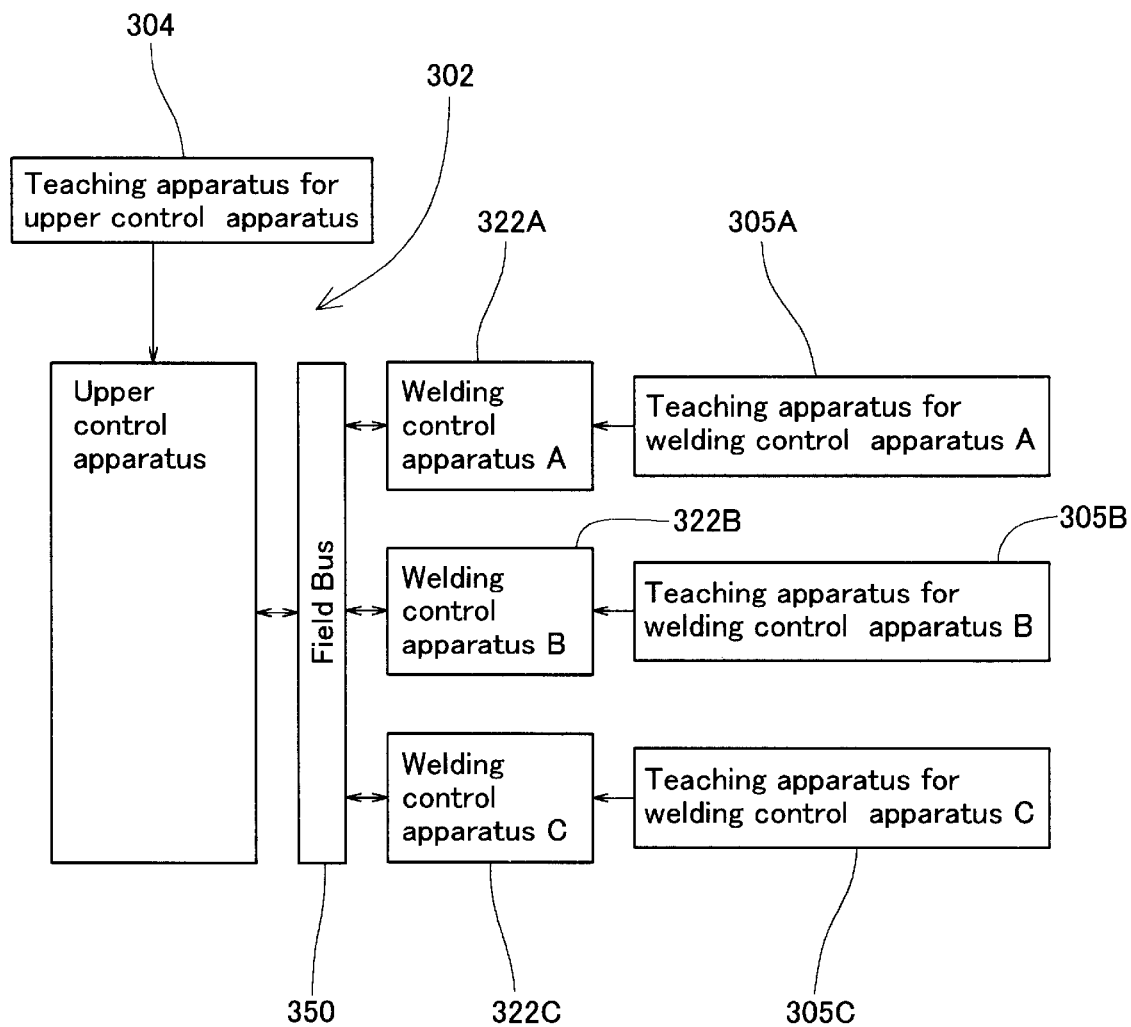
FIG. 3 shows a known welding control system wherein a plurality of welding control apparatus are connected via a field bus.
Figure 4:
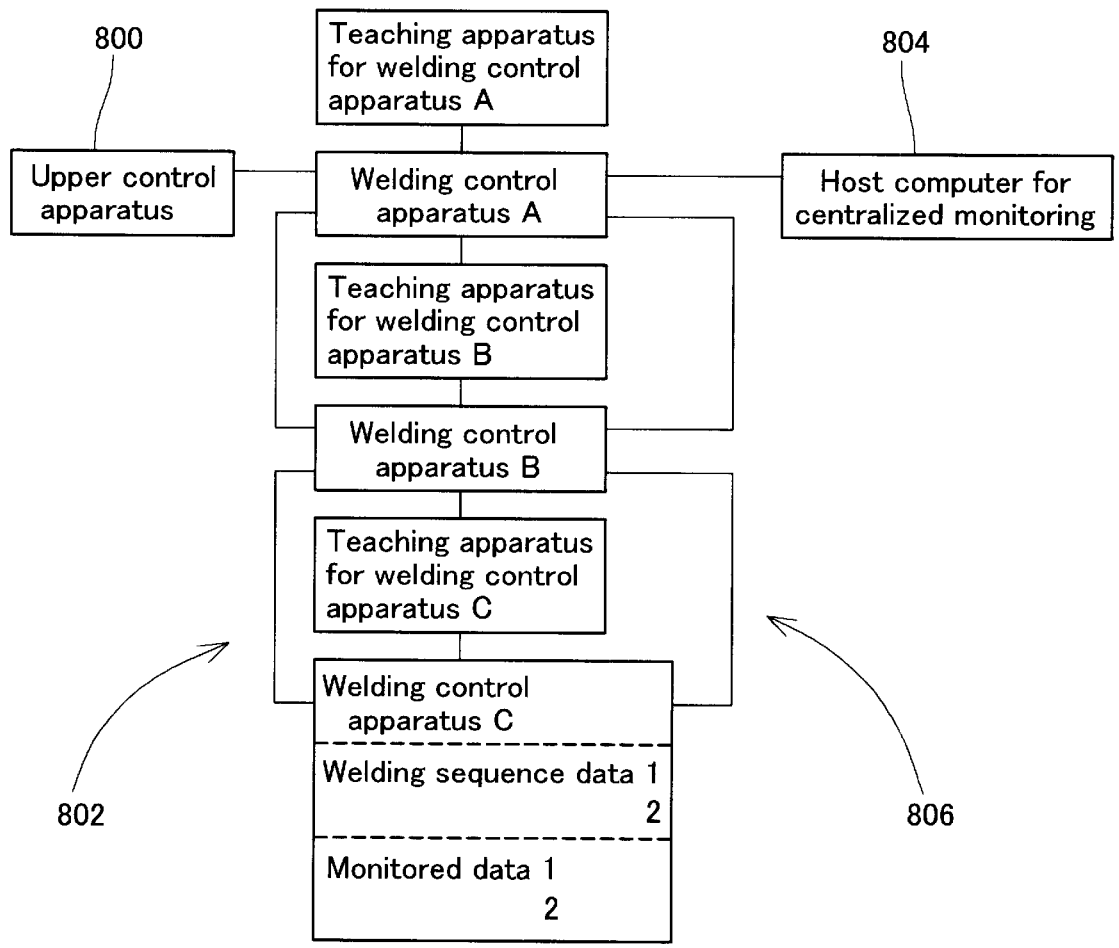
FIG. 4 shows a known welding control system having a centralized monitoring function.

Turning to the figures, the presently preferred apparatus and methods of the present invention will now be described.

Welding control systems may include, for example, an upper control apparatus connected to a welding control apparatus via a field bus. Multiple types of welding sequence data may be stored in the welding control apparatus. When a signal indicating the type of welding is output from the upper control apparatus to the field bus, the welding control apparatus may start the control of welding according to the welding sequence data corresponding to the specified type of welding conditions. Thus, a signal indicating the type of welding conditions also acts as a signal indicating the start timing of the welding operation. In such a system, the internal address data of the welding control apparatus and the welding sequence data may be output from the upper control apparatus to the field bus. Further, the welding operation may be monitored and the data representing the monitored welding conditions may be stored in the welding control apparatus. preferably, the welding control apparatus may output the monitored data to the field bus.

When signals indicating (1) a specific welding control apparatus, (2) a type of welding and (3) the start time of welding are output from the upper control apparatus to the field bus, the designated welding control apparatus may start the control of the welding process according to the welding sequence data, which corresponds to the specified type of welding. In such a system, the apparatus address of a specific welding control apparatus, an internal address of the welding control apparatus and the welding sequence data may be output from the upper control apparatus to the field bus.

A teaching apparatus may be provided for the upper control apparatus. Teaching of the welding control apparatus is possible from the teaching apparatus via the field bus. In this specification, a teaching apparatus is intended to mean a device that can be utilized to program the welding conditions, such as the magnitude of the welding current, the time variation of the current magnitude, the duration of the current flow and the pressure applied to the workpiece(s) by the pair of welding guns. The teaching apparatus also programs the movement of the welding guns during the welding operation. The operator can utilize the teaching apparatus to program certain physical locations in which welds will be performed on the workpiece. Each of the weld locations are stored in the memory of the upper control apparatus, and the welding control apparatus preferably contains a program that can determine the magnitude of the welding current and other welding conditions. This teaching apparatus is also known in the art as a programming box, a teaching pendant or programming pendant. The term "pendant" is used, because the device is generally small enough that the operator can wear the teaching apparatus on a necklace while programming the welding control apparatus. The teaching apparatus usually comprises an input device, such as a keyboard, keypad or other input means to permit the operator to input appropriate data.

When an apparatus address signal designating a specific welding control apparatus and a welding start signal is output from the upper control apparatus to the field bus, the designated welding control apparatus specified in the apparatus address signal may start the welding control process. In such a system, each welding control apparatus may be provided with a first program that stores monitored data, which was detected during the welding operation, in a designated address in the apparatus. A second program may output the monitored data stored in the designated address in the apparatus to the field bus when the apparatus address signal and the apparatus' internal address signal designating a specific address are output to the field bus from the upper control apparatus. Further, each welding control apparatus may contain a program that outputs the monitored data stored in the designated address in the apparatus to the field bus at prescribed times. The welding control apparatus may also contain a third program that starts the execution of the welding control program when an apparatus address signal designating the welding control apparatus and the welding start signal are output to the field bus.

Figure 5:
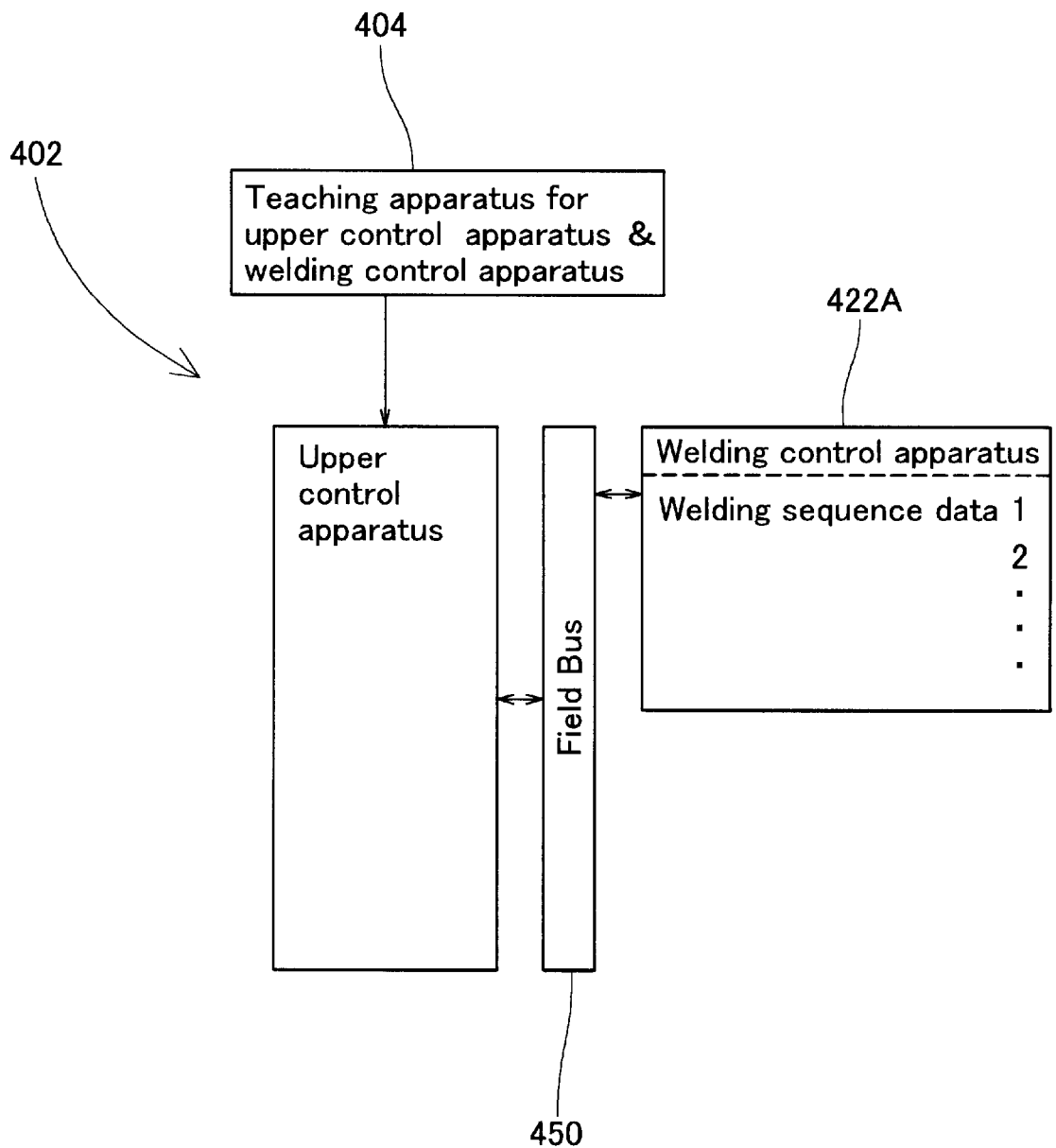
FIG. 5 shows a representative welding control system of the present teachings wherein the welding control apparatus are connected via a field bus.

A representative welding control system is shown in FIG. 5, in which an upper control apparatus 402 is connected to the welding control apparatus 422A via a field bus 450. A number of different types of welding sequence data are stored in the welding control apparatus 422A.

When a signal indicating both the welding type and the welding start timing is output to the field bus 450 from the upper control apparatus 402, appropriate welding control is started by the welding control apparatus 422A according to the welding sequence data corresponding to the required welding type. Additionally, the upper control apparatus 402 outputs the internal address of the respective welding control apparatus and the welding sequence data to the field bus 450 for programming the welding control apparatus 422A.

According to this welding control system, because the upper control apparatus 402 and the welding control apparatus 422A are connected via the field bus 450, the, required number of cables is much less than known welding control systems. A plurality of welding sequence data, such as welding sequence data 1, welding sequence data 2, etc., are stored in the memory of the welding control apparatus 422A. When the signal indicating both the welding type and the welding start timing is output to the field bus 450 from the upper control apparatus 402, the welding control apparatus 422A starts executing the welding process according to the welding sequence data corresponding to the designated welding type.

In this system, the upper control apparatus 402 outputs the internal address of the welding control apparatus 422A and the welding sequence data to the field bus 450 for programming the welding control apparatus 422A. The welding control apparatus 422A then stores the welding sequence data output to the field bus 450 in the designated internal address of the apparatus. The welding sequence data is transmitted to the welding control apparatus 422A in this manner. Consequently, the welding control apparatus 422A can receive the welding instructions from the upper control apparatus 402. There is no need to provide a special teaching apparatus for the welding control apparatus 422A. Furthermore, the administrator of the upper control apparatus 402 is not required to move to the welding control apparatus 422A in order to instruct its operation.

In the welding control system of the present teachings, the monitored data of the welding work in progress is preferably stored in the welding control apparatus 422A, and the monitored data is preferably output from the welding control apparatus 422A to the field bus 450. In this welding control system, the monitored data detected during the welding process is stored in the memory unit of the welding control apparatus 422A. The monitored data is then output from the welding control apparatus 422A to the field bus. Consequently, the monitored data of the welding work in progress is stored centrally in the upper control apparatus 402.

Figure 6:
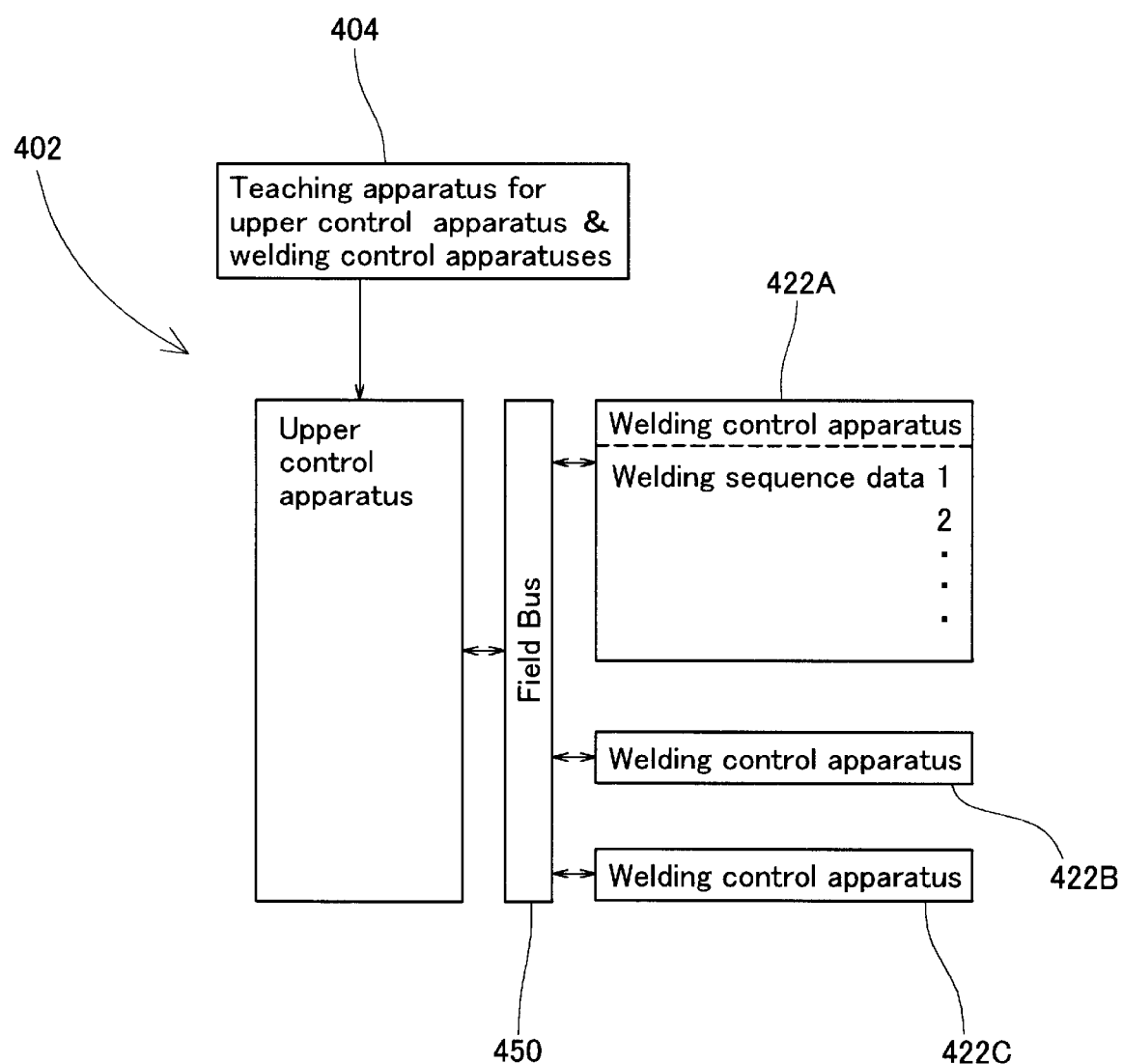
FIG. 6 shows another representative welding control system of the present teachings wherein a plurality of welding control apparatus are connected via a field bus.

Additionally, in another welding control system of the present teachings, the upper control apparatus 402 is connected to a plurality of welding control apparatus 422A, 422B, etc. via a field bus 450, as shown in FIG. 6. The welding sequence data for the plurality of welding types are stored in each welding control apparatus 422A, 422B, etc. A signal designating one the welding control apparatus (for instance 422A), and a signal indicating the type of welding type and the start of welding are output to the field bus 450 from the upper control apparatus 402. At the same time, appropriate welding control is executed by the designated welding control apparatus (422A in this case) according to the welding sequence data corresponding to the designated welding type. The apparatus address data designating one of the welding control apparatus (one of 422A, 422B, etc. in this case), the internal address of the welding control apparatus, and the welding sequence data are output from the upper control apparatus 402 to the field bus 450 for programming the welding control apparatus 422A and 422B, etc.

According to this welding control system, the upper control apparatus 402 can transmit welding sequence data to any desired welding control apparatus. Any one of the desired welding control apparatus can be used to perform any desired type of welding control. Consequently, the operability of the welding control apparatus is greatly improved.

In another welding control system of the present teachings, the upper control apparatus 402 is connected to the welding control apparatus 422A via a field bus 450. A teaching apparatus 404 is provided for the upper control apparatus 402. The welding control apparatus 422A can receive welding instructions from the teaching apparatus 404 via the field bus 450.

In this welding control system, the upper control apparatus 402 and the welding control apparatus 422A are connected via the field bus 450. A teaching apparatus 404 is provided for the upper control apparatus 402. Therefore, the welding control apparatus 422A can be instructed from the teaching apparatus 404 via the upper control apparatus 402 and field bus 450. Consequently, it is not necessary to provide a teaching apparatus for each welding control apparatus, which teaching apparatus exclusively programs a particular welding control apparatus.

Figure 7:
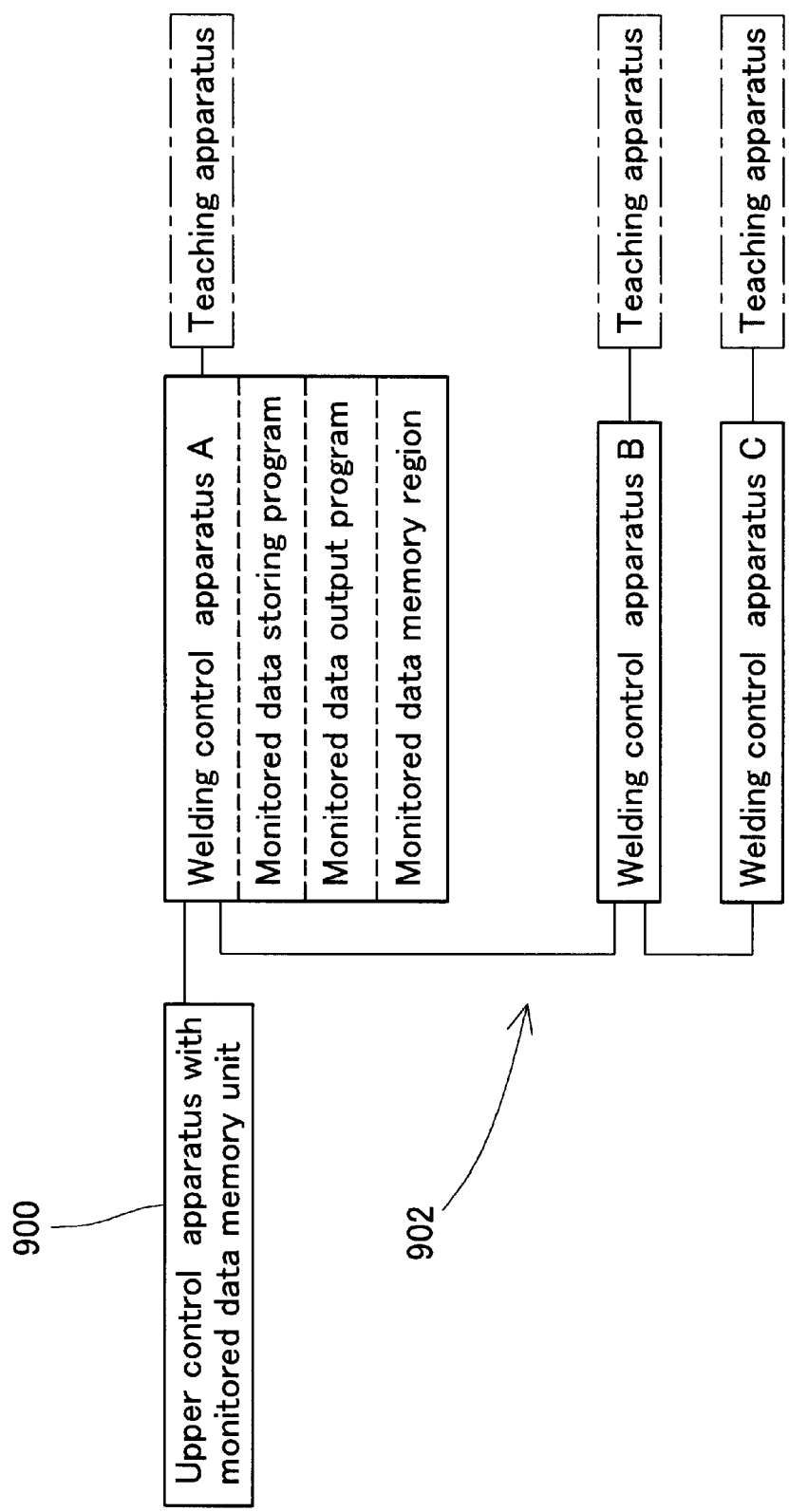
FIG. 7 shows a representative welding control system of the present teachings having a centralized monitoring function.

In another welding control apparatus of the present teachings, the upper control apparatus 900 and a plurality of welding control apparatus A, B, C, etc. are connected via a field bus 902, as outlined in FIG. 7. The apparatus address signal, designating a specific welding control apparatus selected from a group of welding control apparatus A, B, C, etc., and a welding start signal are output from the upper control apparatus 900 to the field bus 902. When this happens, the specific welding control apparatus, designated by the apparatus address, executes the welding control process. Each welding control apparatus may, for example, contain the following software. A first program may store the monitored data detected during the welding control process in a designated address within the apparatus. A second program may output the monitored data stored in the designated address within the apparatus to the field bus 902, which occurs when the apparatus address signal and internal address signal designating a specific address within the apparatus is output from the upper control apparatus 900 to the field bus 902. Alternatively, the second program of each welding control apparatus may be modified such that the second program may output the monitored data stored in the designated addresses in the apparatus to the field bus 902 at prescribed times.

According to the system described above, the monitored data detected during the welding control process are stored in designated addresses within each welding control apparatus. The stored monitored data is output to the field bus 902 when the upper control apparatus 900 makes a request for its output, or at prescribed times, and is transmitted to the upper control apparatus 900. Consequently, centralized monitoring can be performed by the upper control apparatus 900 in this manner without the use of a host computer.

The system may also be constructed to transmit the welding sequence data to each welding control apparatus A, B, C, etc. from each welding control apparatus's own exclusive teaching apparatus. Alternatively, the system may be constructed in order to transmit instructions from the upper control apparatus 900.

Each of the additional features and method steps disclosed above and below may be utilized separately or in conjunction with other features and method steps to provide improved welding control systems and methods for making and using the same. Further, representative examples of the present teachings, which examples will be described below, utilize many of these additional features and method steps in conjunction. However, this detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the present teachings in the broadest sense, and are instead taught merely to particularly describe representative and preferred embodiments of the present teachings, which will be explained below in further detail with reference to the figures.

Figure 8:
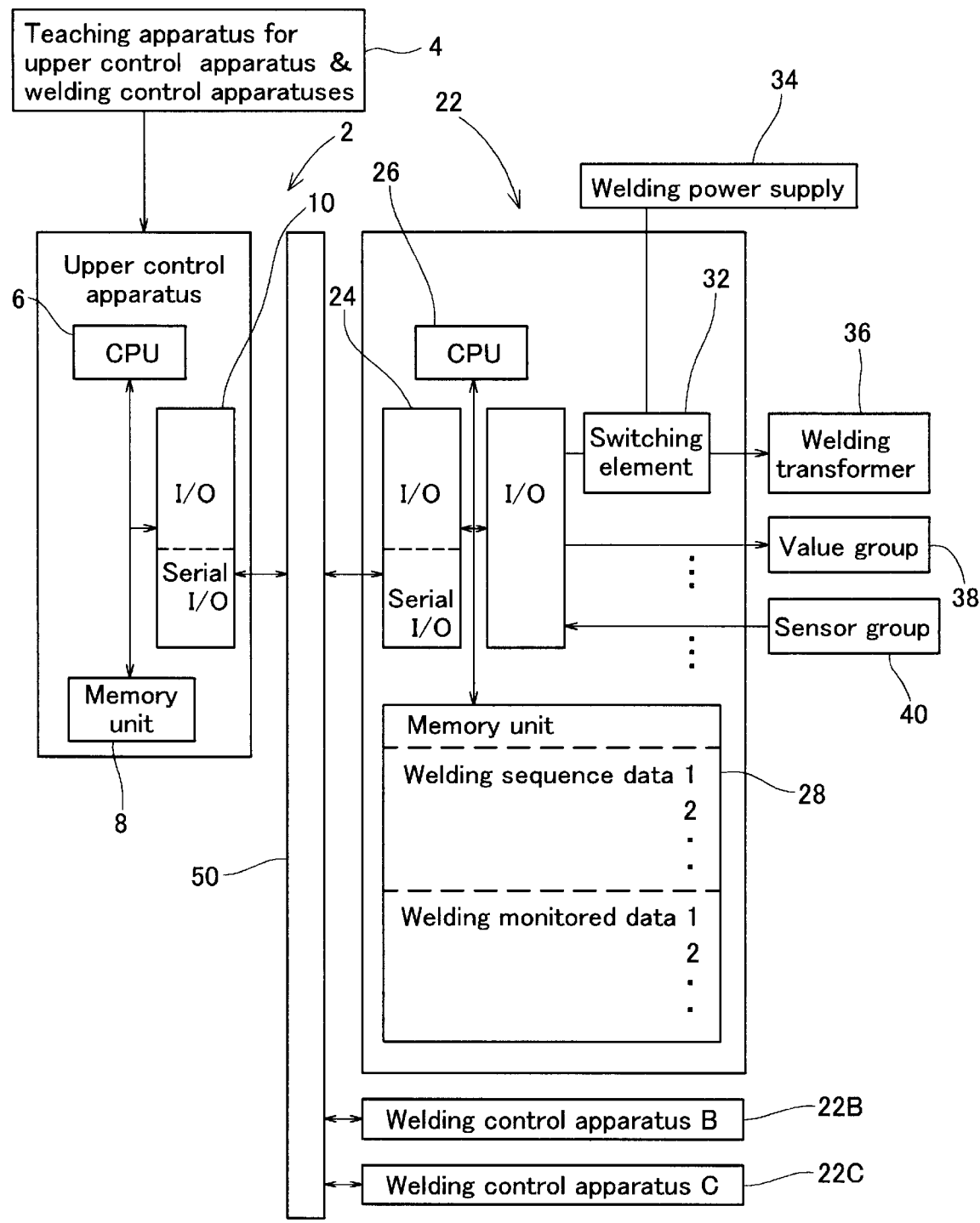
FIG. 8 shows another representative welding control system of the present teachings.

FIG. 8 shows a preferred welding control system, which primarily includes an upper control apparatus 2, welding control apparatus 22, and a field bus 50. In this representative embodiment, a plurality of welding control apparatus are connected to the field bus 50. However, only the No. 1 welding control apparatus 22 and the No. 2 and No. 3 welding control apparatus 22B, and 22C are shown in FIG. 8. The welding control apparatus beyond the fourth apparatus are omitted from the illustration for purposes of clarity only. Because the welding control apparatus 22, 22B, 22C, etc. all may have common constructions, the construction of welding control apparatus 22 will be described in the following representative discussion.

The upper control apparatus 2 controls the workpiece (e.g., an exemplary workpiece is an automobile body) transferring system in this case. The upper control apparatus 2 issues the time to start the welding control process, and the type of welding to be performed at that time, to the welding control apparatus 22. The upper control apparatus 2 also issues the welding sequence data to the welding control apparatus 22 in advance. Additionally, the upper control apparatus 2 centrally stores the monitored data collected by the welding control apparatus 22. The upper control apparatus may include, for example, CPU 6, memory unit 8, and an I/O unit 10.

The welding control apparatus 22 controls the welding process to match the prescribed welding conditions. The welding control apparatus 22 may include, for example, CPU 26, memory unit 28, No. 1. I/O 24, No. 2 I/O 30, and switching element 32. The switching element 32 is placed between the welding power supply 34 and the welding transformer 36. It is controlled by the CPU 26 to intermittently turn the power on and off to control the flow of welding current. The No. 2 I/O unit 30 controls the switching element 32. In addition, the No. 2 I/O unit 30 is connected to a valve group 38 placed in a pneumatic circuit that opens and closes a pair of welding guns (not shown). Operating the valve group 38 controls the opening and closing of the pair of welding guns and the pressure applied to the workpiece(s). The sensor group 40 may include, for example, a detector adapted to detect the actual welding current flow, a detector adapted to detect the actual pressure applied by the welding guns, and a meter adapted to measure the actual time of current flow. Thus, various data can be monitored, such as the magnitude of the welding current, the applied pressure, and the duration of current flow during the welding operation. The monitored data detected by sensor group 40 are stored successively in predetermined addresses in memory unit 28 via I/O unit 30.

The upper control apparatus 2 and the welding control apparatus 22 are connected via a field bus 50. The multiple welding control apparatus 22 are connected in series via the field bus 50. Apparatus addresses are pre-assigned to the upper control apparatus 2 and each welding control apparatus 22. Therefore, the upper control apparatus 2 or one of the welding control apparatus 22 in the welding control apparatus group that inputs data from the field bus 50 can be designated by sending the appropriate apparatus address to the field bus 50.

A teaching apparatus 4 is connected to the upper control apparatus 2. Data necessary to control the workpiece (e.g., automobile body) transferring system, data dictating how far the transferring system will move before the welding control apparatus operates, and what type of welding will be performed at that time, will be transmitted to the upper control apparatus 2 from the teaching apparatus 4. In addition, any desired type of welding sequence data can be transmitted for any desired welding control apparatus. In the latter case, the welding sequence data input from the teaching apparatus 4 is first stored in the memory unit 8 of the upper control apparatus 2 and is then output to the field bus 50.

Figure 9:
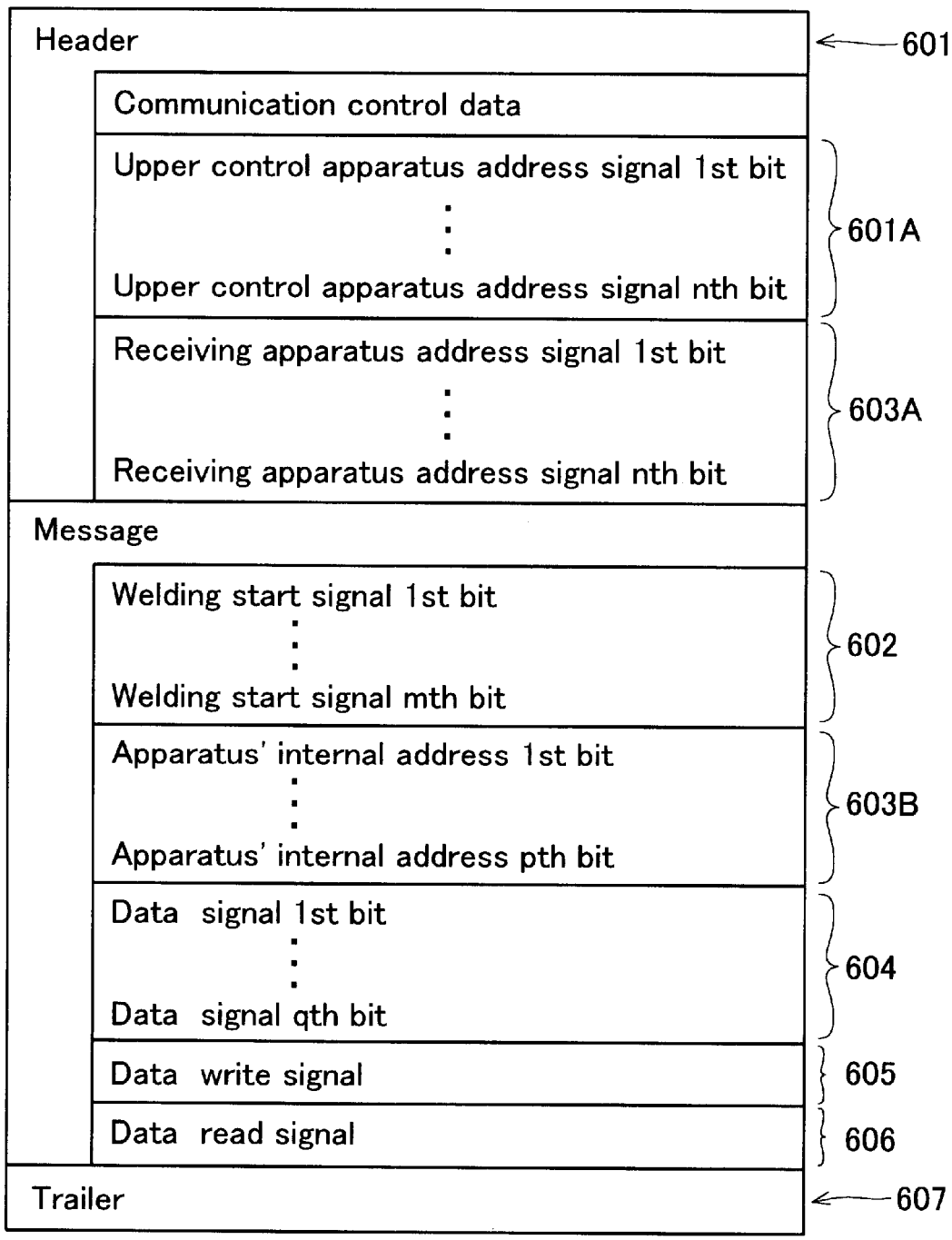
FIG. 9 shows an example of data output to the field bus during teaching.

The data output to the field bus 50 when welding sequence data is transmitted to the welding control apparatus 22 from the upper control apparatus 2 is shown in FIG. 9. In FIG. 9, the header 601 indicates that it is the beginning of a series of data. In the header 601, the upper control apparatus address signal 601A includes n bits that designate the apparatus address of the upper control apparatus 2, which designates the transmitter of the data. The upper control apparatus address signal 601A follows the communication control data. In addition, the apparatus address signal 603A of the receiving apparatus having n bits, which designates the receiver of the data, is included in the object welding control apparatus 22. Since n bits are allocated for the receiving address signal 603A, a total of $2^n-1$ units of welding control apparatus 22 can be connected. (one is subtracted because one apparatus address is assigned to the upper control apparatus 2.)

A message is sent following the header 601, which message contains the welding start signal 602 having m bits. Because the welding start signal has m bits, a total of $2^m-1$ types of welding conditions can be designated for each welding control apparatus. (one is subtracted because a signal having all zeros is not used as a welding start signal.) Next, an internal address for the apparatus 603B having p bits is sent. Because the apparatus' internal address is designated by p bits, $2^p$ addresses can be allocated for the memory regions in order to store the welding sequence data for each welding control apparatus. Next, the welding sequence data 604 having q bits is output. The welding sequence data 604 comprises the welding current, its time variation pattern, the duration of current flow, and the pressure applied to the pair of welding guns, etc. expressed in q bits. Then, a data write signal 605 is output. If this data write signal 605 is set high, the welding sequence data is transmitted to the welding control apparatus 22. Next, a data read signal 606 is output. If this data read signal 606 is set high, the monitored data or other data stored in the welding control apparatus is output to the field bus 50. During normal welding control, data write signal 605 and data read signal 606 are both set low. Finally, the trailer 607 is output signifying the end of the series of data.

The situation where the upper control apparatus 2 issues the welding sequence data to the welding control apparatus 22 will first be described. In this situation, the operator responsible for the task of preparing welding instructions will enter the pertinent data into the teaching apparatus 4. Specifically, data designating the specific welding control apparatus that will be used and the type of welding sequence data that will be transmitted are entered. Next, the welding sequence data of the designated type is entered for the designated welding control apparatus. The entered data are first stored in memory unit 8. Then, signals containing the welding instructions to be transmitted are output to the field bus 50.

When the welding instructions are transmitted, data shown in FIG. 9 is output from the upper control apparatus 2 to the field bus 50. In this case, the data write signal 605 is set high.

When this signal is output to the field bus 50, the following action takes place when the data write signal 605 is set high. The q bits welding sequence data 604 is stored in the welding control apparatus, designated by the n bits apparatus address signal 603A, at the address designated by the p bits apparatus' internal address signal 603B. The specified welding type and the specified welding sequence data are stored together.

As a result, the process of transmitting the welding sequence data to the welding control apparatus 22 from the upper control apparatus 2 via the field bus 50 is completed. It can be clearly understood that the welding sequence data for any desired type of welding condition can be transmitted to any desired welding control apparatus.

Next, the situation where the upper control apparatus 2 advances the workpiece (e.g., automobile body) transferring system to a prescribed state, and starts the welding process will be described. In this case, the upper control apparatus 2 has already received the data concerning the specific welding control apparatus to be used, and the type of welding to be started. Therefore, the m bits welding start signal 602, designating the type of welding, and the n bits apparatus address signal 603A, designating a specific welding control apparatus to perform the welding control process of the designated type, are output to the field bus 50. At this time, it will be understood that the data write signal 605, and data read signal 606 are both set low. It is also understood that the welding control apparatus, designated by the apparatus address signal 603A, is not instructed to transmit the welding sequence data, and that it is not requested to output the monitored data. It will be further understood that welding control apparatus is instructed to start the type of welding designated by the welding start signal 602. Therefore, the welding sequence data for the designated type of welding is read from the memory unit 28, and the welding control process is started.

In other words, the welding control apparatus 22 has its own apparatus address 603A. It contains the software that starts the welding control program, previously stored in the welding control apparatus 22, when both data write signal 605 and data read signal 606 are set low and are output to the field bus 50. Consequently, the switching element 32 is controlled according to the welding sequence data read, and the welding current is adjusted to a value most suitable for the specified type of welding. In addition, the valve group 38 is also controlled according to the welding sequence data read to adjust the applied pressure to the optimum value. The switching element 38 remains turned off after the specified duration of current flow has elapsed, and the current passing is complete. A welding job matching the welding conditions is performed in this manner according to the welding sequence data pre-stored in memory.

The welding control apparatus 22 also contains a program that stores, in designated addresses of the memory unit 28, the results obtained from actually monitoring the welding conditions during the welding process. For example, in the case of current flow, the average welding current passed during the welding process is detected by the sensor and stored in a specific address in the memory unit 28. This specific address is pre-determined and contained in the program as the storage location for the monitored data of the average welding current detected by the sensor. Additionally, the actual pressure applied by the pair of welding guns during the welding process is detected by a sensor and stored in another specific address in the memory unit 28. This address also is predetermined and contained in the program as the storage location for the monitored data of applied pressure detected by the sensor.

Figure 10:
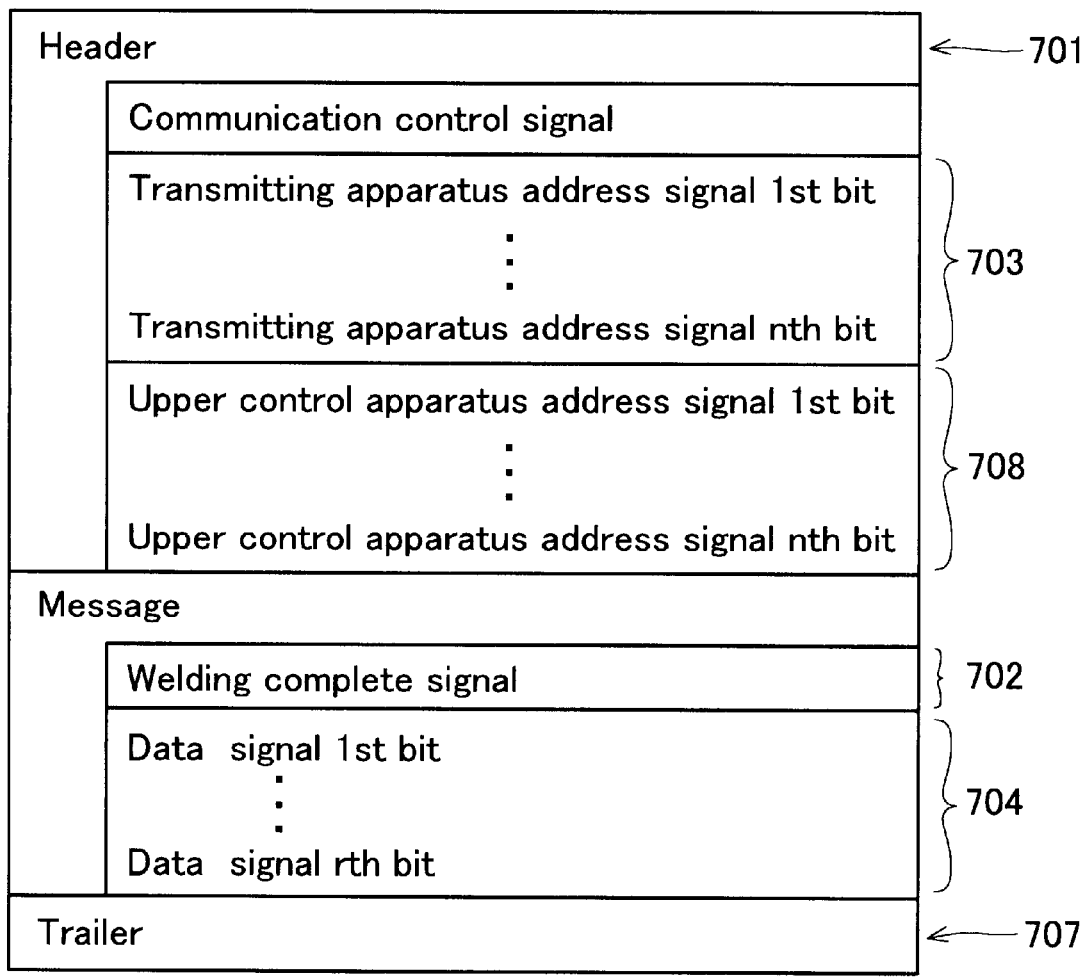
FIG. 10 shows an example of data output to the field bus when welding is completed.

When the welding is complete, the welding control apparatus 22 is programmed to output to the field bus 50 a series of data shown in FIG. 10, in which the header 701 indicates the beginning of the data. In the header 701, n bits of apparatus address signal 703 are included following the communication data. The apparatus address signal 703 identifies the sender that is assigned to the particular welding control apparatus transmitting the data. Additionally, n bits of apparatus address signal 708 are also included, which signal designates the receiving apparatus of the data that is assigned to the upper control apparatus 2 in this case. After the header 701, a message is output. A welding complete signal 702 is included in the message. The monitored data 704 having r bits follow the welding complete signal. Finally, a trailer 707 is output to indicate the end of data.

As the data shown in FIG. 10 is output to the field bus 50, the upper control apparatus 2 verifies which welding control apparatus has completed the welding task (specified by the sender's apparatus address signal 703). It also verifies the status of monitored data of the welding just completed (specified by the r bits monitored data 704). It then stores the monitored data output on the field bus 50 in the memory unit 8.

When the upper control apparatus 4 receives the welding completed signal, the workpiece e.g., automobile body) transferring system is instructed to go into the next operation. consequently, the control of welding and the control of the transferring system of the automobile body can be operated in synchronization.

The welding control apparatus 22 is programmed to output the monitored data 704 to the field bus 50 when the welding process is completed. It is also programmed to output the monitored data, which is shown in FIG. 10, when the data shown in FIG. 9 is output to the field bus 50 from the upper control apparatus 2 when the data read signal 606 is set high. In other words, the upper control apparatus 2 is adapted to extract the monitored data from the welding control apparatus 22 whenever it is necessary. In this case, the upper control apparatus 2 outputs the apparatus address signal 603A and the apparatus' internal address signal 603B, which is shown in FIG. 9, to specify the storage location of the requested monitored data. Additionally, a request to output the monitored data is made to the welding control apparatus 22 by setting the data read signal 606 high.

Incidentally, this method can be used not only to request output of monitored data, but also to designate a desired apparatus' internal address. Therefore, it becomes possible to designate the apparatus' internal address where the welding sequence data is stored. Thus, the upper control apparatus 2 can read the welding sequence data stored in the welding control apparatus 22.

In the welding control system of this embodiment, multiple welding control apparatus are connected to the upper control apparatus 2 via a field bus 50, which is seen in FIG. 8. The monitored data from a plurality of welding control apparatus are stored centrally in the memory unit 8 of the upper control apparatus 2, also shown in FIG. 8. Hence, the operator can more easily monitor the different welding conditions taking place at a number of welding control apparatus. Additionally, the welding instructions can be transmitted to each welding control apparatus from the teaching apparatus 4 of the upper control apparatus 2. Therefore, the welding conditions can be revised and re-transmitted to each welding control apparatus after reviewing the monitored results. Therefore, operability is improved significantly.

As described above, in the welding control system of this representative embodiment, the upper control apparatus 2 and the welding control apparatus 22 are connected by a field bus 50. A number of different types of welding sequence data are stored in the welding control apparatus 22. A signal that indicates the welding type and the welding start time (designated in the welding start signal 602 comprising m bits) may be output to the field bus 50 from the upper control apparatus 2. In that case, welding is controlled according to the welding sequence data corresponding to the type of welding specified by the welding control apparatus 22. Because the welding control apparatus' internal address 603B and the welding sequence data 604 is output from the upper control apparatus 2 to the field bus 50, the welding sequence data can be transmitted to the welding control apparatus 22 from the teaching apparatus 4 for the upper control apparatus 2. Therefore, there is no need to provide an exclusive teaching apparatus for each welding control apparatus. Further, there is no need for the operator to go to the location of welding control apparatus each time to transmit welding instructions.

Also, the monitored data of the welding in progress is stored in the welding control apparatus 22 and the monitored data is output to the field bus 50 from the welding control apparatus 22. As a result, the monitored data can be collected at the upper control apparatus 2 and the monitored data of the production activity can be managed from one centralized location.

Particularly in this embodiment of the invention, because the welding control apparatus is programmed to output the monitored data to the field bus when the welding is completed, the monitored data are collected successively in the upper control apparatus.

In addition, the welding control apparatus is programmed to output the monitored data stored in specific addresses of the apparatus to the field bus, when the apparatus address signal 603A and apparatus' internal address signal 603B are output to the field bus 50 from the upper control apparatus 2. Therefore, centralized management of the monitored data can be performed at the upper control apparatus when necessary.

As indicated in the above-description, the present teachings are useful when a plurality of welding control apparatus 22 are connected to the upper control apparatus 2 via a field bus 50. The upper control apparatus 2 outputs the welding control apparatus' address data 603A, the welding control apparatus' internal address 603B, and the welding sequence data 604 to the field bus 50. Therefore, the welding sequence data for any desired welding type for any desired welding control apparatus can be transmitted from the teaching apparatus 4 connected to the upper control apparatus 2.

The upper control apparatus 2 and the welding control apparatus 22 are connected by the field bus 50, and a teaching apparatus 4 is provided for the upper control apparatus 2. The teaching apparatus 4 can transmit instructions to the welding control apparatus 22 via the field bus 50. Therefore, for example, if data designating a different type of welding conditions is sent to the upper control apparatus 2 from a higher level computer, it is possible for the upper control apparatus to transmit new instructions to the welding control apparatus 22, based on that data. Consequently, operability of the system has been improved significantly.

For example, based upon the present teachings, the welding sequence data and the address data to store the welding sequence data can be sent from the upper control apparatus to the welding control apparatus via the field bus. Therefore, an exclusive teaching apparatus for each welding control apparatus is not required.

Further, the monitored data of the welding being performed is stored in the welding control apparatus and then output from the welding control apparatus to the field bus. Consequently, the monitored data output to the field bus can be verified at the upper control apparatus, and the upper control apparatus can monitor the welding control apparatus.

In this embodiment, a plurality of welding control apparatus are connected to the upper control apparatus. The welding sequence data and address data specifying where the data is to be stored, which will transmitted to a specific welding control apparatus, can be sent to the welding control apparatus from the upper control apparatus via the field bus. Therefore, the plurality of welding control apparatus are not required to have their own exclusive teaching apparatus.

The upper control apparatus and the welding control apparatus are connected via the field bus. A teaching apparatus is provided for the upper control apparatus. Because it is possible to program the welding control apparatus using the teaching apparatus via the field bus, the welding control apparatus can be programmed from the upper control apparatus, which makes the programming task much easier. This embodiment is particularly well suited when the production line is expanded, or when a network is incorporated.

Because the monitored data can be centrally managed utilizing the upper control apparatus necessary for controlling the start timing of the welding process, no additional wiring is required. Thus, the cost of constructing the system can be kept down, and the burden of maintaining and managing the wiring can be reduced.

Further, the monitored data can be accessed whenever necessary at the upper control apparatus.

Moreover, the monitored data can be successively stored at the upper control apparatus. Therefore, the status of the group of welding control apparatus can be successively monitored at the upper control apparatus.

Finally, although the representative embodiment utilizes a central processing unit, any type of processor can be utilized with the present teachings. For example, a general purpose processor or a dedicated processor can be utilized. Further, the memory unit may contain ROM, RAM, or other memory, as appropriate for a particular design. Further, teachings concerning appropriate hardware and software architectures for welding controllers are provided in a U.S. application having the same filing date as this application, having Lyon & Lyon LLP attorney docket number 256/037, naming Shingo Kawai as an inventor and claiming priority to Japanese patent application Ser. No. 11-220402 filed Aug. 3, 1999, Japanese Patent Application Serial No. 11-231028 filed Aug. 18, 1999 and Japanese Patent Application Serial No. 11-232187 filed Aug. 19, 1999, which U.S. application is incorporated herein by reference in its entirety.

Other teachings relevant to the present teachings can be found in U.S. Pat. Nos. 5,483,035, 5,471,028, 5,440,092, 5,347,105 and 5,276,308, which patents are also hereby incorporated by reference in their entirety.

Thus, a preferred method and apparatus for welding has been described. While embodiments and applications of this invention have been shown and described, as would be apparent to those skilled in the art, many more embodiments and applications are possible without departing from the inventive concepts disclosed herein. The invention, therefore, is not to be restricted except in the spirit of the appended claims.

What is claimed is:

1. A welding control system comprising:
a first welding control apparatus comprising a memory, the memory adapted to store multiple types of welding sequence data, each of the multiple types of welding sequence data stored in a one of a plurality of predetermined internal address locations, a switching element adapted to control current flow to a welding gun and a processor coupled to the memory and the switching element, the processor adapted to provide control signals to the switching element based upon one of the welding sequence data stored in the memory, and
an upper control apparatus comprising a processor and a memory, the upper control apparatus coupled to the first welding control apparatus via a field bus, the upper control apparatus adapted to transmit a data signal via the field bus, the data signal comprising welding start data indicating when to start a welding operation according to one of the welding sequence data, the data signal further comprising internal address data that identifies which of the plurality of predetermined internal address locations contains the welding sequence data corresponding to a specified type of welding condition.

2. A welding control system as in claim 1, wherein monitored data detected during the welding operation is stored in a predetermined designated address of the memory of the first welding control apparatus, and the first welding control apparatus is adapted to output the monitored data to the field bus.

3. A welding control system as in claim 2, wherein the memory of the first welding control apparatus contains:
a first program adapted to store monitored data detected during the welding control process in the predetermined designated address of the memory of the first welding control apparatus, and a second program adapted to output the monitored data stored in the predetermined designated address of the memory of the first welding control apparatus to the field bus.

4. A welding control system as in claim 3, wherein the second program is adapted to output the monitored data to the field bus when the first welding control apparatus address signal and an internal address signal of the first welding control apparatus are output to the field bus from the upper control apparatus.

5. A welding control system as in claim 1 further comprising:
a second welding control apparatus comprising a second memory, the second memory adapted to store multiple types of welding sequence data in second predetermined memory locations, a second switching element adapted to control current flow to a second welding gun and a second processor coupled to the second memory and the switching element, the second processor adapted to provide control signals to the switching element based upon one of the welding sequence data stored in the memory, and
wherein the upper control apparatus is connected to the first and second welding control apparatus via the field bus, wherein the first and second welding control apparatus are adapted to start the welding operation according to one of the welding sequence data corresponding to the specified type of welding conditions when the data signal, which comprises an external address indicating a specific one of the first or second welding control apparatus and welding start data, is output from the upper control apparatus to the field bus.

6. A welding control system as in claim 5, wherein monitored data detected during the welding operation for a particular welding control apparatus is stored in a predetermined designated address of the memory for that particular welding control apparatus, and the first and second welding control apparatus are adapted to output the monitored data to the field bus.

7. A welding control system as in claim 6, wherein both the first and second welding control apparatus contain:
a first program adapted to store monitored data detected during the welding control process in the predetermined designated address in the respective welding control apparatus, and
a second program adapted to output the monitored data stored in the predetermined designated address to the field bus.

8. A welding control system as in claim 7, wherein the second program is adapted to output the monitored data to the field bus when the designated welding control apparatus address signal and an internal address signal of the designated welding control apparatus are output to the field bus from the upper control apparatus.

9. A welding control system as in claim 8, further comprising a teaching apparatus coupled to the upper control apparatus, wherein the teaching apparatus is adapted to program the first and second welding control apparatus via the field bus.

10. A welding control system as in claim 5, further comprising a teaching apparatus coupled to the upper control apparatus, wherein the teaching apparatus is adapted to program the first and second welding control apparatus via the field bus.

11. A welding control system as in claim 5 further comprising at least a third welding control apparatus coupled to the upper control apparatus.

12. A welding control system comprising:

a plurality of welding control apparatus, each of the plurality of welding control apparatus assigned a unique external address distinguishing each of the plurality of welding control apparatus from one another, each welding control apparatus comprising a memory adapted to store a plurality of welding sequence data, each of the plurality of welding sequence data stored at a predetermined internal address in the memory, a switching element adapted to control current flow to a welding gun and a processor coupled to the memory and the switching element, the processor adapted to provide control signals to the switching element based upon the welding sequence data stored in the memory, an upper control apparatus comprising a processor and a memory, the upper control apparatus coupled to the plurality of welding control apparatus via a field bus, the upper control apparatus transmitting a message to the plurality of welding control apparatus, the message comprising the unique external address and the predetermined internal address in the memory for a desired welding operation, and a teaching apparatus coupled to the upper control apparatus, wherein the teaching apparatus is adapted to program the plurality of welding control apparatus via the field bus.

13. A welding control system comprising:

a plurality of welding control apparatus, each welding control apparatus comprising a memory adapted to store welding sequence data, a switching element adapted to control current flow to a welding gun and a processor coupled to the memory and the switching element, the processor adapted to provide control signals to the switching element based upon the welding sequence data stored in the memory, an upper control apparatus comprising a processor and a memory, the upper control apparatus coupled to the plurality of welding control apparatus via a field bus, wherein a designated welding control apparatus specified in an apparatus external address signal is adapted to start a welding control process when the apparatus external address signal of the designated welding control apparatus and a welding start signal are output from the upper control apparatus to the field bus, and each welding control apparatus comprises:

a first program adapted to store monitored data detected during the welding control process in a predetermined designated address of the memory in the welding control apparatus, and a second program adapted to output the monitored data stored in the predetermined designated address of the memory in the welding control apparatus to the field bus.

14. A welding control system as in claim 13, wherein the second program is adapted to output the monitored data to the field bus when the apparatus external address signal and an internal address signal of the designated welding control apparatus are output to the field bus from the upper control apparatus.

15. A welding control system as in claim 13, wherein the second program is adapted to output the monitored data at prescribed times.

16. A welding control apparatus adapted to be connected to an upper control apparatus via a field bus, comprising a processor and a memory coupled to the processor and containing:

a first program adapted to start execution of a welding sequence data by the processor when an apparatus address signal, which designates the welding control apparatus, and a welding start signal are output to the field bus, a second program adapted to store monitored data, which is detected while the welding sequence data is in progress, in a predetermined designated address in the memory, and a third program adapted to output the monitored data stored in the predetermined designated address in the memory to the field bus.

17. A welding control apparatus as in claim 16 wherein the third program is adapted to output the monitored data stored in the predetermined designated address to the field bus when the apparatus address signal and an internal address signal designating the predetermined designed address are output to the field bus.

18. A welding control apparatus as in claim 16 wherein the third program is adapted to output the monitored data to the field bus at prescribed times.

19. A welding control system comprising:

a plurality of welding control apparatus as in claim 16 and a common teaching apparatus coupled to the plurality of welding control apparatus, wherein the common teaching apparatus is adapted to program the plurality of welding control apparatus via the field bus.

* * * * *